United States Patent
Gaylord et al.

[15] 3,648,954
[45] Mar. 14, 1972

[54] SEAT RESTRAINT AND SINGLE RELEASE FOR THE SAME

[72] Inventors: John A. Gaylord, San Rafael; Norris N. Murray, San Bruno, both of Calif.

[73] Assignee: H. Koch & Sons Inc., Corte Madera, Calif.

[22] Filed: Apr. 24, 1970

[21] Appl. No.: 31,526

[52] U.S. Cl. ................................................244/122 B
[51] Int. Cl. ..................................................B64d 25/06
[58] Field of Search ............244/122, 122.18, 122.2, 151; 280/150 SB; 297/385, 389

[56] References Cited

UNITED STATES PATENTS

| | | | |
|---|---|---|---|
| 2,836,382 | 5/1958 | Martin | 244/122 |
| 2,857,123 | 10/1958 | Martin | 244/151 |
| 2,914,273 | 11/1959 | Bolton et al. | 244/151 |
| 2,989,362 | 5/1961 | Gimalouski | 244/151 |

FOREIGN PATENTS OR APPLICATIONS

| | | | |
|---|---|---|---|
| 524,963 | 5/1956 | Canada | 244/151 |

*Primary Examiner*—Milton Buchler
*Assistant Examiner*—Carl A. Rutledge
*Attorney*—George B. White

[57] ABSTRACT

A seat restraint for ejection seats in aircraft to resist shock loads generated by ejection, including shoulder straps attached to the backrest of the seat, chest or side belts extending from the shoulder straps to the backrest of the ejection seat; lap belts and leg belts; and a single release device into which the free ends of the shoulder straps and lap belts are secured to be released by manipulation of a single handle.

7 Claims, 8 Drawing Figures

PATENTED MAR 14 1972 3,648,954
SHEET 1 OF 2
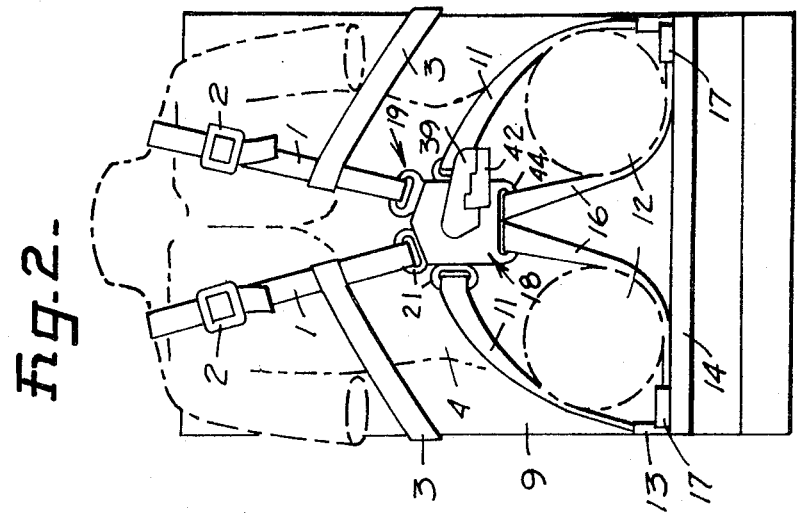
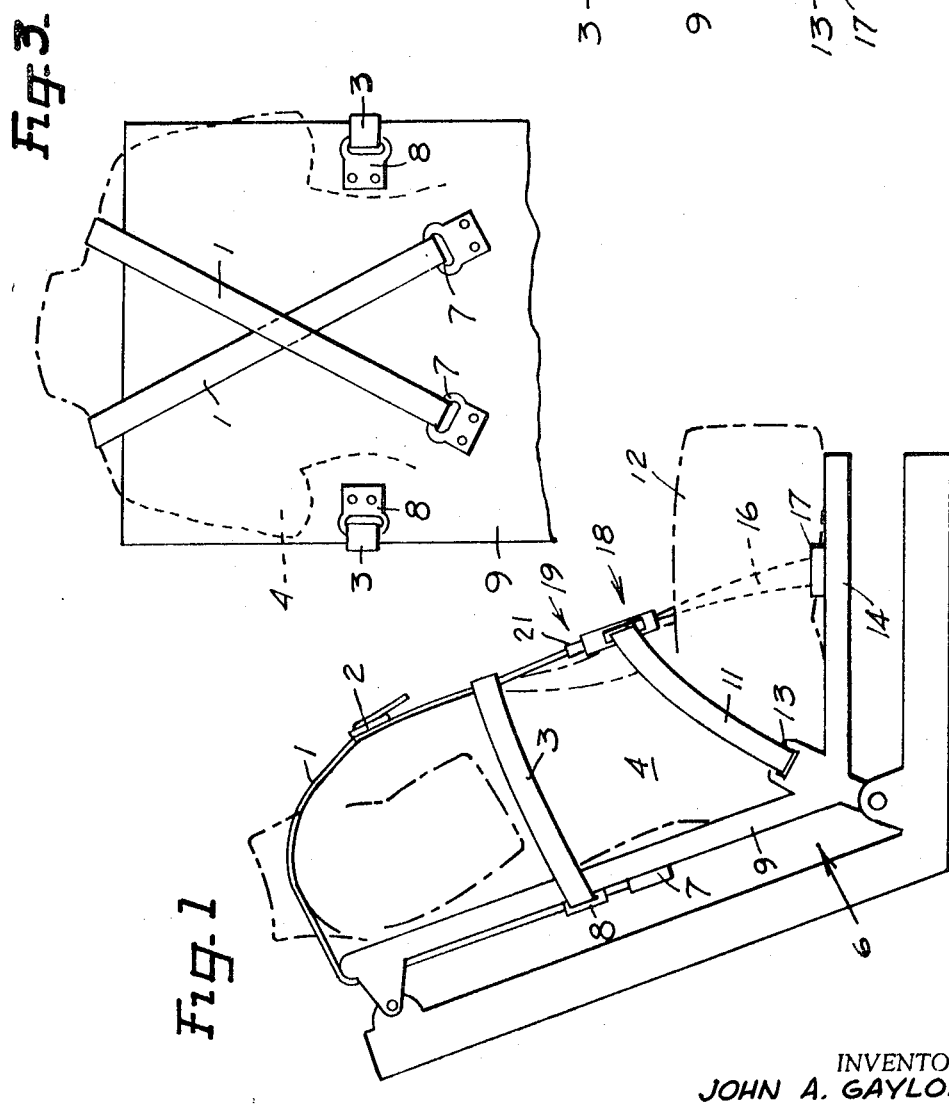
INVENTORS
JOHN A. GAYLORD
NORRIS N. MURRAY
BY
George B White
ATTORNEY

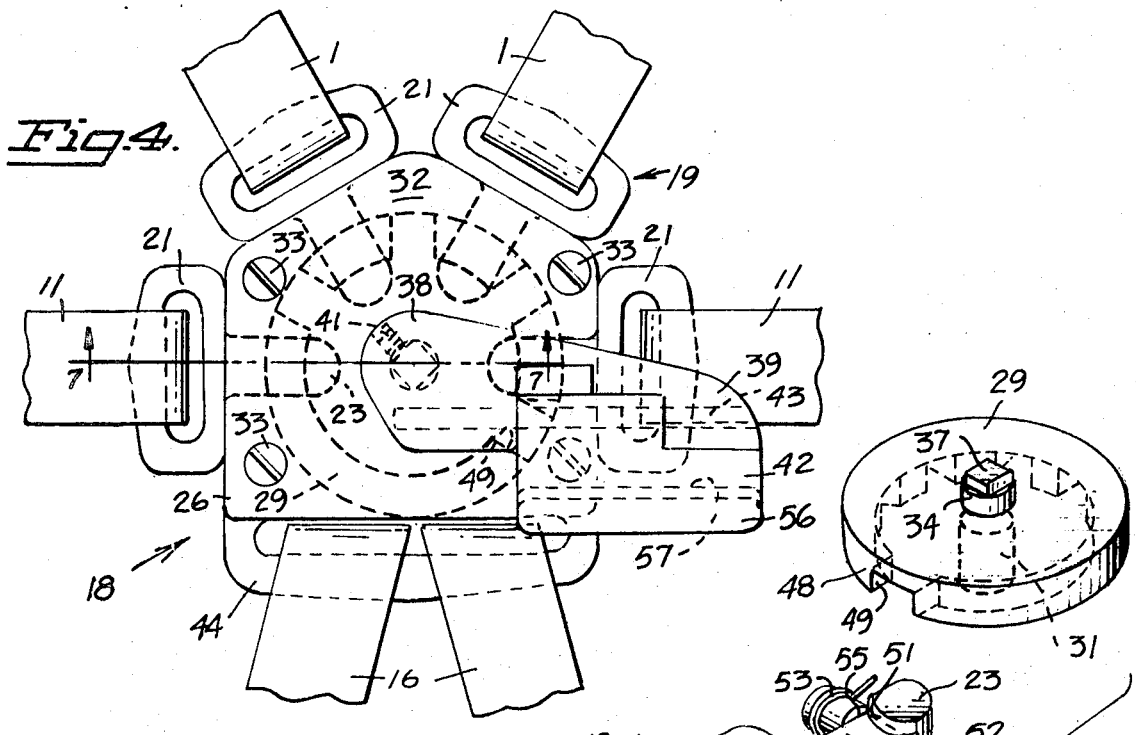

SEAT RESTRAINT AND SINGLE RELEASE FOR THE SAME

BACKGROUND OF THE INVENTION

A harness system in an aerial ejection seat must resist about a 20 G perpendicular force and substantially a horizontal 40 G force during ejection, both forces being so directed as to pull the body outwardly from the ejection seat. Such harness must securely restrain the entire torso of the aircraft personnel, yet the harness must be releasable instantaneously without the need for individual strap or belt disconnects and without attendant fumbling and delay.

A feature of the invention is that the harness system is capable of quickly and easily applying restraining belts over the shoulder, chest and sides, and the lap and thighs of the body, by simple insertion of pronged connections into an automatically locking unitary single release device, which is conveniently located in front of the body for manipulation to instantaneously and simultaneously release all the prongs of said connections at will.

BRIEF DESCRIPTION OF THE DRAWINGS

FIG. 1 is a side view of the restraint harness as applied to a body, the ejection seat being indicated diagrammatically.

FIG. 2 is a front view of the harness system of the body.

FIG. 3 is a rear view of the harness system, illustrating the connections to the back rest of the ejection seat.

FIG. 4 is a front view of the single release device for the restraint harness.

FIG. 5 is a developed view of the disk of the single release device and the prong connection.

FIG. 6 is a sectional view of the release device, the section being taken on about the lines 6—6 of FIG. 7, without the straps and belts.

FIG. 7 is a fragmental sectional view of the release device, the section being taken on lines 7—7 of FIG. 4.

FIG. 8 is a fragmental sectional view showing a pronged connection during insertion into the release device.

DETAILED DESCRIPTION

The restraint device herein includes a pair of shoulder straps 1, each having a usual separable and adjustable buckle 2 for suitable tightening. A side belt 3 on each side of the torso 4 of the body in the ejection seat 6 extends from each shoulder belt 1 over about the chest and a side of the torso. The back ends 7 of the shoulder straps 1 and the back ends 8 of the side belts 3 are anchored on the back rest 9 of the ejection seat 6.

A lap belt 11 extends over the top of each thigh 12 and has its back end 13 anchored near the back of the seat portion 14 of the ejection seat 6, as shown in FIG. 1. Leg belts 16 have their back ends 17 anchored at opposite side edges of the seat 14 and extend between the thighs 12 to the single release device 18.

Each shoulder strap 1 and lap belt 11 has on its front end a pronged connection 19 insertable into the single release 18. The front ends of the leg belts 16 are permanently secured to the single release device 18 so that when the restraint is released the single release device 18 is suspended on the leg belts 16.

Each pronged connection 19 includes a loop 21 into which the respective front end of the strap of belt is secured, and a prong 22 extends from the loop 21. The prong 22 is flat and has a boss 23 projecting from its top at an end thereof. A tapered edge 24 of the boss 23 at the end of the prong 22 facilitates insertion.

The single release device 18 includes a base 26 which has a central boss 27 with a bearing pocket 28 therein. A locking disk 29 has a stub shaft 31 rotatable in the bearing pocket 28 as shown in FIG. 7. A cover 32 is superimposed on the disk 29 and is secured to the base 26 by screws 33 shown in FIGS. 4 and 6. A short shaft 34 extends from the top of the disk 29 through a hole 36 in the cover 32 and has thereon a polygonal lug 37. The hub 38 of a handle 39 is secured on the lug 37 by set screw 41 so that when the handle 39 is rotated it correspondingly turns the locking disk 29. On the handle 39 is a handle flap 42 on a pivot 43 so that the flap 32 can be turned into an out of the way flat position, as shown in FIG. 4, when the disk is in locking position, and can be turned up into a plane at right angles to the plane of the cover 32 to facilitate the turning of the handle 39 and the disk 29 into releasing position.

The base 26 has a fixed loop 44 into which are secured the leg belts 16 for suspending the release device 18. The cover 32 has a flange 46 extending from each side thereof all around, to space the cover 32 from the base 26 and also to form a housing. In the respective flanges 46 are a plurality of cutaway slots 47 to permit the withdrawal of the respective prongs 22 and bosses 23. The locking disk 29 has a circular flange 48 all around provided with cutaway recesses 49 registerable with the respective slots 47 of the cover flange 46 to permit the release of the prong bosses 23 therethrough. The thickness of the circular flange 48 is such that when the disk 29 is turned into locking position, namely so as to shift the recesses 49 out of registry when the slots 47, then the flange 48 engages the locking face 51 of the boss 23 and prevents the removal or withdrawal of the prong 23.

The prong 22 is held against the flange 48 by a rockable pin 52 as shown in FIG. 7. The pin is yieldably held by a coil spring 53 anchored in the base 26 in the position shown in FIG. 7. Namely the pin 52 rotatably nests in a semi-cylindrical seat 54 and has a portion thereof cut away to form a pin recess 56 of about the same length as the width of the prong 23. In this manner the prong 22 can be inserted and locked because the bottom of the recess 56 faces outwardly toward the slot 47, and as the boss 23 engages the bottom of the pin recess 56, it turns the pin 54 from the position shown in FIG. 7 to the out of the way position shown in FIG. 8. The distance between the base 26 and the lower edge of the flange 48 accommodates the prong 22 and the boss 23 as shown in FIG. 8. After the locking face 51 of the boss 23 clears the inside periphery of the flange 48 the spring 53 turns the pin 54 back toward the position shown in FIG. 7 thereby to hold the boss 23 in the locking position shown in FIG. 7.

Initially the recesses 49 are out of registry with the slots 47, whereby all the prongs 22 are locked into the release device. In order to simultaneously and quickly release all the straps and belts, the flap 42 is turned up and the handle 39 is turned in a contra-clockwise direction viewing FIG. 4 so as to shift the recesses 49 into registry with the slots 47 and permit the withdrawal of the bosses 23 and prongs 22 from the release device instantaneously. The flap 42 has a lip 56 which engages a notch 57 in a corner of the cover 32 to prevent accidental turning of the handle.

We claim:

1. In a restraint for aircraft ejection seats, body restraining straps and belts each being secured to the ejection seat, a single connector and release device, means on said straps and belts connected to said single device, and manipulable means to release said connected means at will simultaneously, said connected means including prong elements, said single device including, a housing having openings through its sides, said prong elements being insertable through the respective openings, a disk in the housing, means to journal said disk in said housing for rotation relatively to said openings, keeper means on said disk engaged by the respective prong elements for locking said prong elements in place, said manipulatable means being adapted to impart rotating movement to said disk simultaneously to shift said keeper means out of engagement from the respective prong elements, and including a shaft extended from said disk through the top of said housing, a handle secured to said shaft and positioned substantially flat on the top of said housing, a handle flap pivoted to said handle positioned normally flat on top of said housing and being turnable into a position substantially at right angles to the plane of said top of the housing for manipulation.

2. In the restraint specified in claim 1, said straps and belts including, shoulder straps fitting over the shoulders of the person in the ejection seat, lap belts fitting over the thighs of said person, and leg belts extendable from below the thighs between the legs of said person.

3. In the restraint specified in claim 2, connecting means between said leg belts and said connecting device suspending said device when the other straps and belts are freed.

4. In the restraint specified in claim 2, and side belts extended from said shoulder belts and secured to the back rest of said ejection seat.

5. In the restraint specified in claim 1, said keeper means being a locking flange extended from said disk toward said base, each of said connecting means including a holder for a strap or belt, and a projection formed on each prong engagable with said disk flange, said disk having openings through said disk flange registerable with said housing openings for permitting the withdrawal of said prongs, said disk being rotatable from said initial position to a releasing position wherein said flange openings are aligned with said housing openings.

6. In the restraint specified in claim 5, the space between said flange and said base being sufficient to admit said prong projection, a resiliently yieldable element aligned with said flange to urge said prong toward said flange for interlocking said projection with said flange, and said prong and said resiliently yieldable element being capable of co-acting to shift said resiliently yieldable element out of the way of said projection during the passage of said projection past said flange.

7. In the restraint specified in claim 6, said resiliently yieldable element being a pin nested in said base opposite said flange at a distance of about the thickness of said prong and less than the thickness of said projection, said pin having a recess on one side thereof of a depth substantially equal to the height of said projection to permit passage of said projection between said pin and said flange, spring means to normally turn said pin into a position wherein said recess is turned away from said flange and toward the adjacent housing opening whereby said projection can engage said recess for turning said pin out of the way during passage of said projection beyond said flange.

* * * * *